United States Patent
Lin et al.

(10) Patent No.: US 11,100,790 B2
(45) Date of Patent: Aug. 24, 2021

(54) SYSTEMS AND METHODS FOR DETERMINING PROJECTED TARGET LOCATION OF A HANDHELD OBJECT

(71) Applicant: Universal City Studios LLC, Universal City, CA (US)

(72) Inventors: Yu-Jen Lin, Orlando, FL (US); Michael Beavers, Orlando, FL (US); Stephen Burkett, Orlando, FL (US); Joshua David Danzig, Southbury, CT (US); Kyle P. Hanley, Orlando, FL (US); Humberto Kam, Orlando, FL (US); Anthony Melo, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/749,865

(22) Filed: Jan. 22, 2020

(65) Prior Publication Data

US 2021/0090429 A1     Mar. 25, 2021

Related U.S. Application Data

(60) Provisional application No. 62/905,901, filed on Sep. 25, 2019.

(51) Int. Cl.
*G08C 17/02* (2006.01)
*A63H 30/04* (2006.01)
(Continued)

(52) U.S. Cl.
CPC ............ *G08C 17/02* (2013.01); *A63H 30/04* (2013.01); *G06F 3/017* (2013.01); *G06F 3/0308* (2013.01); *G06T 7/80* (2017.01)

(58) Field of Classification Search
CPC ................................ G06C 17/00; G08C 17/02
See application file for complete search history.

(56) References Cited

U.S. PATENT DOCUMENTS 7,850,527 B2* 12/2010 Barney ................ A63F 13/822
                                                          463/37
7,854,655 B2* 12/2010 Mao ...................... A63F 13/10
                                                          463/30

(Continued)

FOREIGN PATENT DOCUMENTS

CN    103247031 B    3/2016
KR    101332741 B1   11/2013

OTHER PUBLICATIONS

Clarkson et al., "Distortion Correction of Depth Data from Consumer Depth Cameras," www.shu.ac.uk/research/cser, www.depthbiomechanics.co.uk, pp. 1-12, 2013.

(Continued)

*Primary Examiner* — K. Wong
(74) *Attorney, Agent, or Firm* — Fletcher Yoder P.C.

(57) ABSTRACT

A projected target location of a handheld object is determined based on applying translation factors, scaling factors, and offsets to a location of a reference element of the handheld object detected by a camera on a two-dimensional plane. The translation factors are determined based on a difference between a calibration location on the plane and an initial location of the reference element corresponding to the calibration location, and serve to shift the location of the reference element to generate the projected target location. The scaling factors are determined based on an estimated length of a user's arm holding the handheld object, and serve to scale the location of the reference element to generate the projected target location. The offsets are determined based on polynomial equations, and serve to extend the distance between the projected target location and the calibration location.

23 Claims, 9 Drawing Sheets

(51) Int. Cl.
*G06T 7/80* (2017.01)
*G06F 3/03* (2006.01)
*G06F 3/01* (2006.01)

(56) References Cited

U.S. PATENT DOCUMENTS

| | | |
|---|---|---|
| 9,463,379 B1 | 10/2016 | Brister et al. |
| 10,134,267 B2* | 11/2018 | Kawash .................. A63G 31/00 |
| 10,269,257 B1 | 4/2019 | Gohl et al. |
| 10,488,950 B2* | 11/2019 | Wilson .................. G06F 3/0346 |
| 2005/0143173 A1 | 6/2005 | Barney et al. |
| 2010/0199228 A1 | 8/2010 | Latta et al. |
| 2013/0190093 A1 | 7/2013 | Wohlstadter et al. |
| 2013/0285903 A1 | 10/2013 | Langridge et al. |
| 2014/0240102 A1 | 8/2014 | Kawash et al. |
| 2016/0179205 A1 | 6/2016 | Katz |

OTHER PUBLICATIONS

Khoshelham, "Accuracy Analysis of Kinect Depth Data," International Archives of the Photogrammetry, Remote Sensing and Spatial Information Sciences, vol. XXXVIII-5/W12, 2011, ISPRS Calgary 2011 Workshop, Aug. 29-31, 2011, Calgary, Canada.
PCT/US2020/051843 International Search Report and Written Opinion dated Dec. 14, 2020.

* cited by examiner

SYSTEMS AND METHODS FOR DETERMINING PROJECTED TARGET LOCATION OF A HANDHELD OBJECT

CROSS-REFERENCE TO RELATED APPLICATIONS

This application claims the benefit of U.S. Provisional Application Ser. No. 62/905,901, entitled "Systems and Methods for Determining Projected Target Location of a Handheld Object," filed Sep. 25, 2019, which is hereby incorporated by reference in its entirety for all purposes.

BACKGROUND

The present disclosure relates generally to a handheld object used for pointing and, more particularly, to determining a projected target location of the handheld object.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A handheld object may be used to point at or select a target. For example, in the setting of a theme park, a patron may point at an animated figure of an attraction using the handheld object, and, in response to detecting this, a system may cause the animated figure to output a user interaction experience (e.g., wagging a tail). However, it is now recognized that certain physical characteristics relating to the user's body may present difficulties in accurately determining when the user is pointing at the target.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
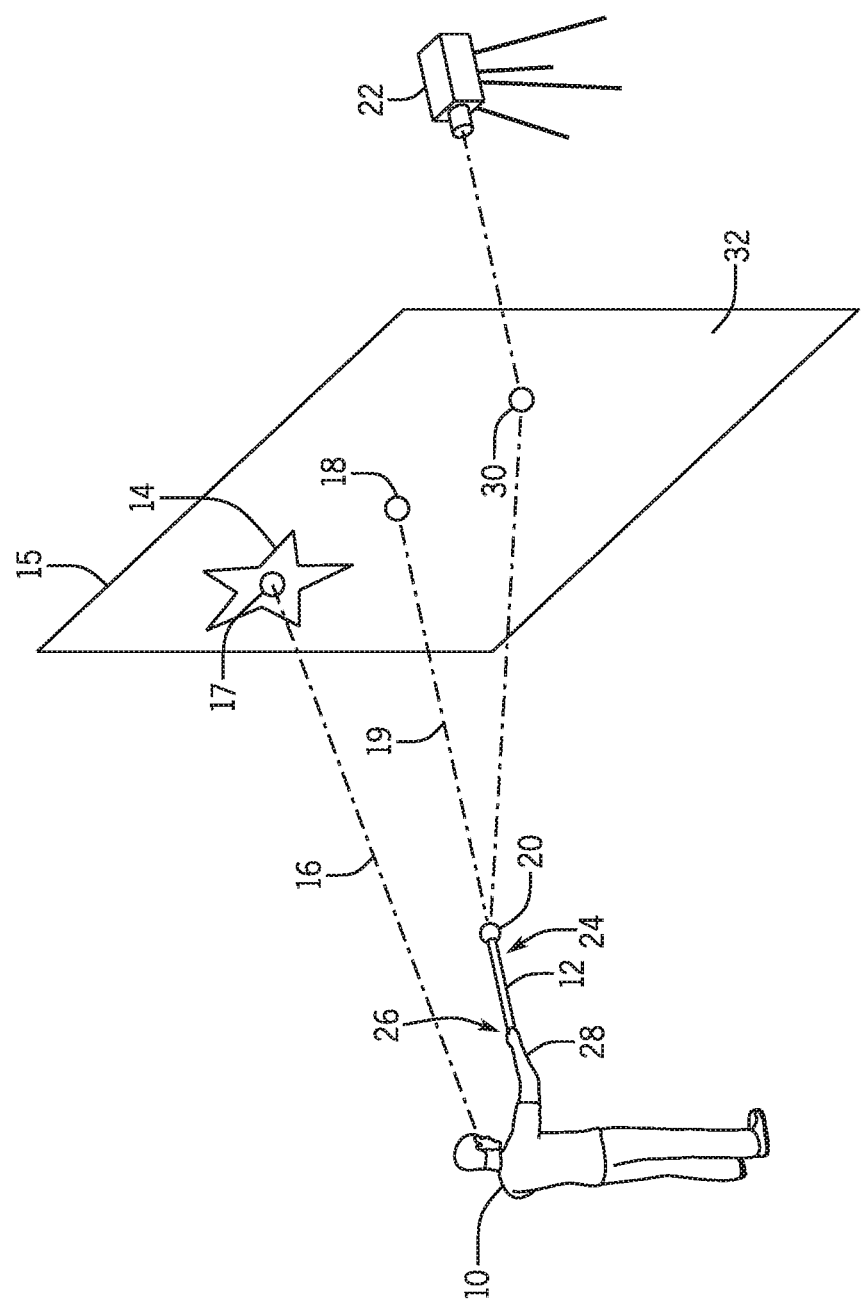
FIG. 1 is a diagram of a user pointing a handheld object at a target, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to handheld objects used for pointing and, more particularly, to determining a projected target location of the handheld object. In particular, the reference element may provide an indication as to where a handheld object is pointing. For example, in the setting of a theme park, a user may point at an animated object (e.g., a robot or otherwise animated figure) of an attraction using the handheld object, and, in response to detecting the location of the reference element, the animated object may output a user interaction experience (e.g., wagging a tail). As another example, the user may point at a word on a poster, and, in response to detecting the location of the reference element, a nearby speaker may output a voice speaking the word. As yet another example, the user may point to an image of a person on an electronic display, and, in response to detecting the location of the reference element, the display may play a video showing the person in the image moving.

The presently disclosed systems and methods include using a camera to determine locations of the reference element on a two-dimensional plane perpendicular to the direction of the camera. The camera may detect a reference element of the handheld object, which may be made of a material (e.g., a retroreflective material) that is more easily detectable by the camera. The location of the reference element may be used to determine a target location at which the user was pointing the handheld object. However, in some systems, a user's perception as to where they are pointing the handheld object may not match a projected location of where the user is pointing that is determined based on the camera's view. This could be due to a variety of factors, including dominance of one eye over another (e.g., right eye-dominant or left eye-dominant), tilting of the head, shifting of body weight, leaning toward one side or another, and so on. Any combination of these factors may cause the user's perception of where they are aiming to shift, while their hand is pointing the handheld object in the same location. It should be noted that a camera is an example of various light detectors that may be used in accordance with present embodiments. Accordingly, reference to a camera is representative of the other light detectors that may be used by embodiments of the present disclosure.

The presently disclosed systems and methods include providing a calibration point on the two-dimensional plane, at which a user may point the handheld object. The location of the reference element in relation to the two-dimensional plane may be determined as an initial location, and one or more translation factors may be determined based on the difference of the initial location and the calibration point. That is, the calibration point may correlate to where the user perceives they are pointing the handheld object, while the initial location of the reference element may correlate to the location of the reference element on the two-dimensional plane from the camera's point-of-view. The difference between the two may be used to translate subsequent detected reference element locations on the two-dimensional plane from the camera's point-of-view to projected target locations (e.g., corresponding to where the user perceives they are pointing or intends to point). That is, the one or more translation factors may compensate for the difference between the user's perception as to where they are pointing the handheld object and the camera's determination of where the reference element is located on the two-dimensional plane.

Moreover, users move and point the handheld object using their arms, which may act as a radius of a sphere or spherical segment in a model of the interaction, with their shoulders being treated as a center of the sphere. As the users move the handheld object or points to different targets, the respective locations of the reference element of the handheld object may vary between users despite pointing at the same targets. This may be due to different arm lengths of the users.

Accordingly, the presently disclosed systems and methods determine a height of the reference element (e.g., from the ground) based on the initial location of the reference element, and estimate the user height based on the height of the reference element. From the user height, a user arm length may be estimated, which may be used to determine one or more scaling factors. The one or more scaling factors may scale or multiply the subsequent detected reference element locations on the two-dimensional plane from the camera's point-of-view to more accurately determine the projected target locations (e.g., corresponding to where the user perceives they are pointing or intends to point). In this manner, the one or more scaling factors may compensate for the difference between user arm lengths.

Upon detection of a subsequent reference element location by the camera, the one or more translation factors and one or more scaling factors may be applied to the subsequent reference element location to determine a projected target location in relation to the two-dimensional plane. Present embodiments may include a processor that operates to analyze data captured and communicated by the camera to provide relevant data, such as the translation factors, scaling factors, projected target location in relation to the two-dimensional plane, and so forth.

Additionally, a user may move the handheld object in an arcuate or circular nature due to their arm acting as a radius of a sphere or spherical segment, with their shoulder as a center. However, the camera, which determines the location of the reference element of the handheld object on a flat two-dimensional plane, may distort a determined location of the reference element due to the difference in shape between the arcuate movement of the handheld object in space and the flat two-dimensional plane detectable by the camera.

Accordingly, the presently disclosed systems and methods may determine one or more offsets to apply to the projected target location that compensate for this distortion. The one or more offsets may shift the projected target location to increase or extend the distance between the projected target location and the initial location in order to compensate for the difference in shape between the arcuate nature of the user's arm movement and the flat two-dimensional plane. For example, the one or more offsets may be determined using polynomial regression that fits test data to one or more polynomial equations (e.g., polynomial equations of the third order).

In some embodiments, multiple reference element zones (e.g., where the reference element is located along an arc based on the user's arm) may be determined that correspond to multiple projected target zones (e.g., projected on the two-dimensional plane). Each projected target zone may correspond to a respective set of polynomial equations that may accurately compensate for the distortion applicable to that projected target zone. As such, the camera may detect the reference element in a reference element zone, a respective projected target zone may be determined that corresponds to the reference element zone, and a respective set of polynomial equations that corresponds to the respective projected target zone may be used to determine the one or more offsets to be applied to the location of the reference element to compensate for this distortion. In such embodiments, the multiple reference element zones may be different sizes (e.g., the reference element zones decrease in size the farther the reference element zone is from the two-dimensional plane) while the multiple projected target zones are the same size, or the multiple reference element zones may be the same size while the multiple projected target zones are different sizes (e.g., the projected target zones increase in size the farther the projected target zone is from the reference element).

By way of introduction, FIG. 1 is a diagram of a user 10 pointing a handheld object 12 at a target 14, according to an embodiment of the present disclosure. The target 14 may be a physical object, a drawing, a photo, a graphic, and so on. In some cases, the target 14 may be an image output by a display. The target 14 may be printed on, etched on, written on, projected on, attached on, or otherwise displayed on a structure 15. The user's perception is indicated by a first dashed line 16. That is, the user 10 perceives that they are pointing the handheld object 12 at the target 14, and specifically at a target location 17. However, due to certain human elements, such as dominance of one eye over another, tilting of the head, shifting of body weight, leaning toward one side or another, and so on, despite the user's perception or intention, the user 10 actually points the handheld object 12 at actual target location 18, as indicated by dashed line 19.

The handheld object 12 may be representative of or include any suitable object the user 10 may use to point or refer to the target 14, such as a stick, a pencil, a toy or model of a gun or weapon, a wand, and so on. The handheld object 12 may include a reference element 20, which may facilitate determining where the user 10 is pointing. In particular, a camera 22 may detect a location of the reference element 20, and the reference element 20 may be made of a material or device that enables the camera 22 to more easily detect the reference element 20. For example, the reference element 20 may be made of a retroreflective material (e.g., retroreflective glass beads, microprisms, or encapsulated lenses sealed onto a fabric or plastic substrate), metal tape, and so on. In another example, the reference element 20 may include an identifier (e.g., a unique graphical design, a barcode, a Quick Response (QR) code, and so on) that enables the camera 22 to identify the reference element 20. As illustrated, the reference element 20 may be located at an end 24 of the handheld object 12 opposite from an end 26 at which the user's hand 28 is holding the handheld object 12. This may facilitate determining the direction in which the user is pointing the handheld object 12, though the reference element 20 may be disposed on any portion of the handheld object 12, or even the user 10.

The camera 22 may detect the location 30 of the reference element 20 with respect to a two-dimensional plane 32. The location 30 may be used to determine the target location 17 at which the user 10 perceives they are pointing or intended to point by applying one or more translation factors. As illustrated, the two-dimensional plane 32 may share the same plane as the structure 15, though, in some embodiments, the two-dimensional plane 32 and the structure 15 may not share the same plane. For example, the two-dimensional plane 32 and the structure 15 may be parallel to one another. Moreover, to enable the camera 22 to detect the location 30 of the reference element 20, the structure 15 may be made semi-transparent, transparent, or include any other suitable property that enables the camera 22 to detect the location 30 of the reference element 20.

In particular, one or more translation factors may be applied to the location 30 of the reference element 20 to compensate for a difference between the user's perception as to where they are pointing the handheld object 12 and the camera's determination of where the reference element 20 is located on the two-dimensional plane 32. The one or more translation factors may be determined during a calibration process where the user 10 points their handheld object 12 at a calibration point, and the camera 22 detects this initial location of the reference element 20 on the two-dimensional plane 32. The one or more translation factors may represent one or more distances that the initial location is shifted to result in the calibration point (e.g., with respect to the two-dimensional plane 32). Additionally, the one or more translation factors may mitigate or compensate for dominance of one eye over another (e.g., right eye-dominant or left eye-dominant), tilting of the head, shifting of body weight, leaning toward one side or another, and so on.

Moreover, one or more scaling factors may be applied to the location 30 of the reference element 20 to account or compensate for a difference between user arm lengths. That is, users move and point the handheld object 12 using their arms, which may act as a radius of a sphere or spherical segment, with their shoulders as a center of the sphere. As the users move the handheld object 12 or point to different targets, the respective locations of the reference element 20 of the handheld object 12 may vary between users despite pointing at the same targets, due to different arm lengths of the users.

Accordingly, a height of the reference element 20 (e.g., from the ground) may be determined based on the initial location of the reference element 20, and the user height may be estimated based on the height of the reference element 20. From the user height, a user arm length may be estimated, which may be used to determine the one or more scaling factors. The one or more scaling factors may scale or multiply the location 30 of the reference element 20 detected by the camera 22 on the two-dimensional plane 32.

Additionally, one or more offsets may be applied to the location 30 of the reference element 20 to generate the projected target location of the handheld object 12 to compensate for a distortion resulting from the arcuate or circular movement of the user's arm. That is, the distortion may be caused by a difference in shapes between the arcuate movement and the camera's detection of the location 30 of the reference element 20 on the flat two-dimensional plane 32. The one or more offsets may shift the projected target location to increase or extend the distance between the projected target location and the initial location in order to compensate for the difference in shape between the arcuate nature of the user's arm movement and the flat two-dimensional plane. For example, the one or more offsets may be determined using polynomial regression that fits test data to a polynomial equation, such as a third order polynomial equation.

In this manner, the projected target location of the handheld object 12 may be generated, which may closely match the target location 17 at which the user 10 perceives that they are pointing the handheld object 12. Advantageously, unlike certain other systems, only one point of calibration is used to determine the translation factors, the scaling factors, and the offsets, and accurately determine the projected target location of the handheld object 12. Whereas, in other applications (e.g., a pointing device used in presentations), it may not be as important to decrease calibration time as calibration may occur prior to an actual performance (e.g., during a preparation phase) and is not observed by an audience or patron. However, in the instant case (e.g., at an attraction of a theme park), it may be important to create an immersive user experience by hiding or preventing the user 10 from noticing that calibration is being performed. As such, reducing the calibration process down to a single point (e.g., pointing the handheld object 12 at a single calibration point) may serve to heighten or enhance the user experience.

Figure 2:
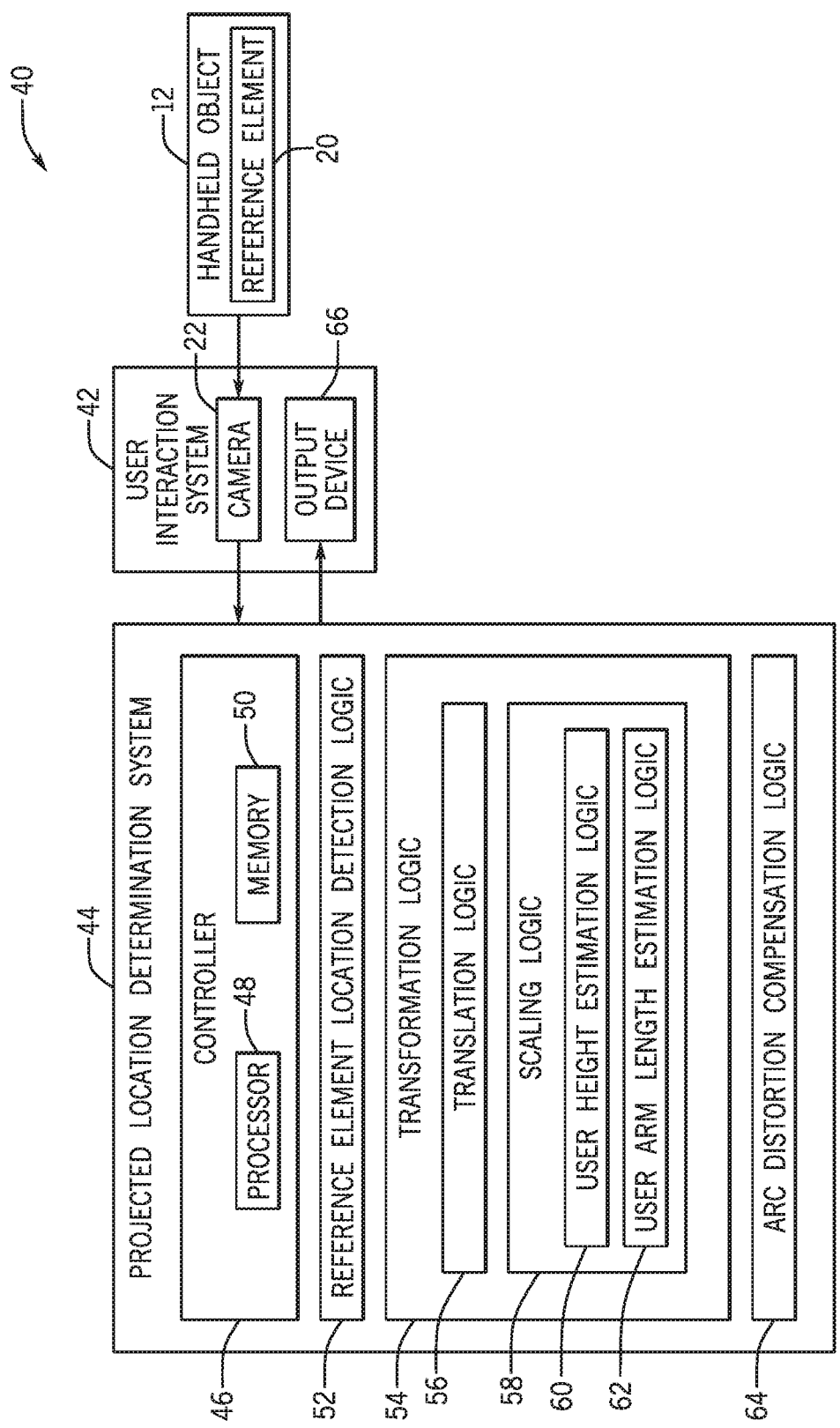
FIG. 2 is a block diagram of a theme park attraction system, according to embodiments of the present disclosure.

With this in mind, FIG. 2 is a block diagram of a theme park attraction system 40, according to embodiments of the present disclosure. The theme park attraction system 40 may enable the user 10 to point the handheld object 12 at various targets 14, and output a user interaction experience based on determining the user 10 pointed the handheld object 12 at a target 14. For example, the theme park attraction system 40 may include a setting having characters popular with children, a television or movie-themed setting, a shooting gallery, a collection of targets, and so on.

The theme park attraction system 40 may include the handheld object 12 with the reference element 20, as held and manipulated by the user 10. The theme park attraction system 40 may also include a user interaction system 42, which includes the camera 22 that detects a location of the reference element on the two-dimensional plane 32. The theme park attraction system 40 may further include a projected location determination system 44, which determines a projected target location of the handheld object 12. In particular, the projected target location may represent a location on the two-dimensional plane 32 at which the user 10 perceives they are pointing or intends to point. Indeed, the closer the projected target location is to the target location 17, the more accurate the projected target location.

The projected location determination system 44 may include a controller 46, having one or more processors (illustrated as a single processor 48) and one or more memory or storage devices (illustrated as a single memory device 50). The processor 48 may execute software programs and/or instructions stored in the memory device 50 that facilitate determining the projected target location of the handheld object 12. Moreover, the processor 48 may include multiple microprocessors, one or more "general-purpose" microprocessors, one or more special-purpose microprocessors, and/or one or more application specific integrated circuits (ASICS). For example, the processor 48 may include one or more reduced instruction set (RISC) processors. The memory device 50 may store information such as control software, look up tables, configuration data, and so forth. The memory device 50 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium. The memory device 50 may store a variety of information and may be used for various purposes, such as instructions that facilitate the projected target location of the handheld object 12.

The projected location determination system 44 may also include reference element location detection logic 52 that determines a location of the reference element 20 on the two-dimensional plane 32. In particular, the projected location determination system 44 may be communicatively coupled to the user interaction system 42 by any suitable means, such as via wired communication or over a communication network using a wireless communication protocol or technology (e.g., radio, Bluetooth, WiFi, infrared, Ethernet, Thread, ZigBee, Z-Wave, KNX, mobile, and/or microwave). The reference element location detection logic 52 may thus receive captured images (e.g., imagery) from the camera 22 that show the reference element 20 on the two-dimensional plane 32. The reference element location detection logic 52 may determine a location of the reference element 20 on the two-dimensional plane 32 as expressed by, for example, a two-dimensional coordinate (e.g., x and y) system.

The projected location determination system 44 may further include transformation logic 54 that transforms the location of the reference element 20, as determined by the reference element location detection logic 52, into a projected target location with respect to the two-dimensional plane 32. The transformation logic 54 includes translation logic 56 that determines the one or more translation factors that compensate for a difference between the user's perception as to where they are pointing the handheld object 12 and the camera's determination of where the reference element 20 is located on the two-dimensional plane 32.

In particular, the translation logic 56 may determine the one or more translation factors by performing a single-point calibration process. This process includes receiving a calibration location on the two-dimensional plane 32, receiving a location of the reference element 20 on the two-dimensional plane 32 (e.g., corresponding to when the user 10 points the handheld object 12 at the calibration location), and determining the one or more translation factors based on the difference in locations between the calibration location and the location of the reference element 20.

Figure 3:
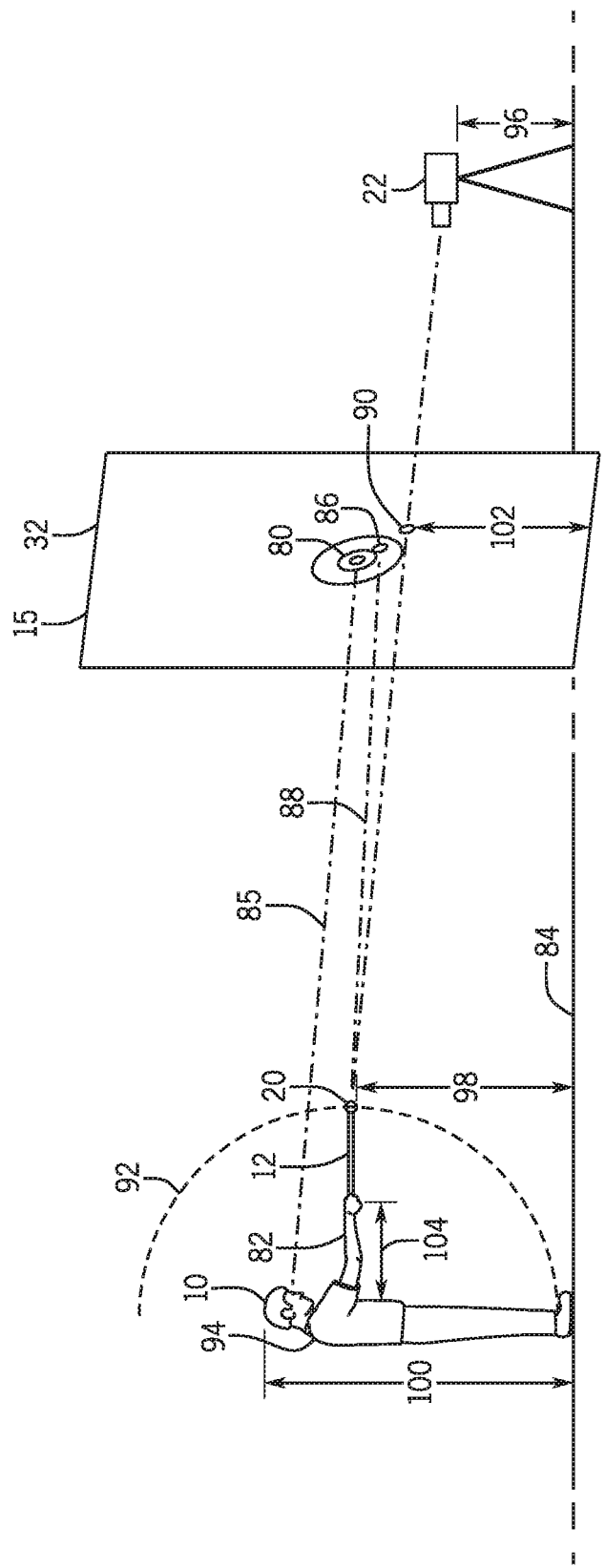
FIG. 3 is a diagram of a user pointing a handheld object at a calibration location, according to an embodiment of the present disclosure.

FIG. 3 is a diagram of a user 10 pointing a handheld object 12 at the calibration location 80, according to an embodiment of the present disclosure. The calibration location 80 may correspond to a physical object, a drawing, a photo, a graphic, and so on. In some cases, the calibration location 80 may correspond to an image output by a display. The user 10 may be prompted by instructions provided in any suitable format (e.g., written, etched, printed, attached, or displayed on the structure 15). The calibration location 80 may be provided to enable users to position their arms similarly to enable a controlled manner to detect user height, while also enabling the projected location determination system 44 of FIG. 2 to determine a difference between the user's perception as to where they are pointing the handheld object 12 and where the user 10 is actually pointing the handheld object 12. For example, the calibration location 80 may be located to enable the user 10 to extend their arm 82 as close to parallel as possible to the ground 84, at a certain angle with respect to a plane parallel to the ground, and so on. In some embodiments, the calibration location 80 may be customized for user heights. That is, in some embodiments, the calibration location 80 may be located lower on the structure 15 for users sitting in vehicles, such as wheelchairs, personal electric vehicles, strollers, and so on. As another example, the calibration location 80 may be located higher on the structure 15 for adults than for children, the calibration location 80 may be located higher on the structure 15 for male users than for female users, and so on.

As such, the calibration location 80 may be predetermined and known by the projected location determination system 44. Upon prompting, the user 10 may extend their arm 82 and point the handheld object 12 at the calibration location 80. However, due to the distortion effects caused by the human body, such as dominance of one eye over another, tilting of the head, shifting of body weight, leaning toward one side or another, the user's choice of hand holding the handheld object 12 (e.g., right hand vs. left hand), physical limitations (e.g., that affect range of motion), whether the user's movement may be altered due to an encumbrance (e.g., a backpack or holding a child) and so on, despite the user's perception of or intent to point the handheld object 12 at the calibration location 80 as indicated by the dashed line 85, the user 10 may actually point the handheld object 12 at another location, such as actual calibration location 86, as indicated by dashed line 88.

The camera 22 detects the location 90 of the reference element 20 on the two-dimensional plane 32, and sends an indication of the location 90 to the projected location determination system 44. The translation logic 56, which may be part of a model of human interactions, may then determine a difference in location between the location 90 of the reference element 20 and the predetermined calibration location 80, which may be expressed in two-dimensional (e.g., x and y) coordinates. The translation logic 56 may use the difference to generate one or more translation factors that may be applied to subsequent detected locations of the reference element 20 to shift the subsequent detected locations of the reference element 20 and determine subsequent projected target locations of the handheld object 12 that correspond to where the user 10 intended to point the handheld object 12. The translation factors may be provided in the form of a transformation matrix, which may be applied to a subsequent detected location of the reference element 20 to generate a projected target location of the reference element 20, as shown below:

$$\begin{vmatrix} x \\ y \\ 1 \end{vmatrix} = \begin{vmatrix} 1 & 0 & X \\ 0 & 1 & Y \\ 0 & 0 & 1 \end{vmatrix} = \begin{vmatrix} x' \\ y' \\ 1 \end{vmatrix} \qquad \text{Equation 1}$$

where: x=the horizontal component of the location 90 of the reference element 20 on the two-dimensional plane 32;
y=the vertical component of the location 90 of the reference element 20 on the two-dimensional plane 32;
X=the horizontal difference between the reference element 20 and the calibration location 80 on the two-dimensional plane 32;
Y=the vertical difference between the reference element 20 and the calibration location 80 on the two-dimensional plane 32;
x'=the horizontal component of the projected target location of the handheld object 12 on the two-dimensional plane 32; and
y'=the vertical component of the projected target location of the handheld object 12 on the two-dimensional plane 32.

Figure 4:
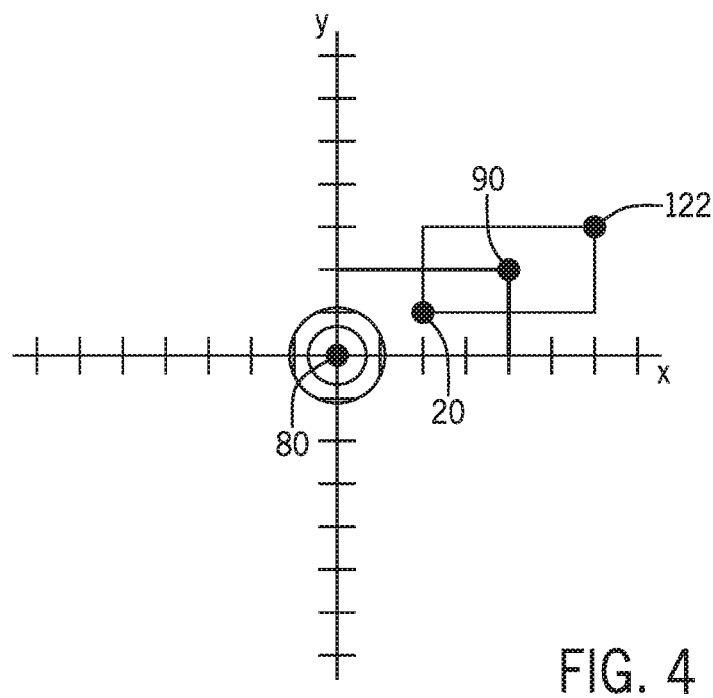
FIG. 4 is a diagram of an example of applying one or more translation factors to a subsequent detected location of a reference element of the handheld object of FIG. 3, according to embodiments of the present disclosure.

For example, FIG. 4 is a diagram of an example of applying the one or more translation factors to a subsequent detected location 120 of the reference element 20, according to embodiments of the present disclosure. As illustrated, during calibration, the location 90 of the reference element 20 is 2 units (e.g., centimeters) to the right of the calibration location 80 and 1 unit (e.g., centimeter) up from the calibration location 80. As such, the translation factors may include +2 in the horizontal direction and +1 in the vertical direction. Accordingly, X may be set to +2 and Y may be set to +1 in the transformation matrix. The translation logic 56 may apply the transformation matrix to the subsequent detected location 120 (e.g., [4, 2]) of the reference element 20 to shift the subsequent detected location 120 to the right by 2 units and up 1 unit, to generate the projected target location 122 at 6 units to the right of the calibration location 80 and 3 units up (e.g., [6, 3]). Thus, the translation logic 56 may compensate for the difference between the user's perception as to where they are pointing the handheld object 12 and the camera's determination of where the reference element 20 is located on the two-dimensional plane 32.

Turning back to FIG. 2, the transformation logic 54 may also include scaling logic 58 that determines the one or more scaling factors that compensate for differences between user arm lengths. That is, as shown in FIG. 3, users 10 move and point the handheld object 12 using their arms 82, which may act as a radius of a sphere or spherical segment 92, with their shoulders as a center 94 of the sphere. As the users 10 move the handheld object 12 to point to different targets, the respective locations of the reference element 20 of the handheld object 12 may vary between users 10 despite pointing at the same targets, due to different arm lengths of the users 10.

In particular, the scaling logic 58 may determine the one or more scaling factors based on the location 90 of the reference element 20 detected by the camera 22 during the calibration process. The height 96 of the camera 22 from the ground 84 may be predetermined and known by the scaling logic 58. Thus, the scaling logic 58 may determine a height 98 of the reference element 20 from the ground 84 based on the location 90 of the reference element 20 and the predetermined height 96. Based on the height 98 of the reference element 20, user height estimation logic 60 of the scaling logic 58 may determine the user's height 100. In particular, test or sample data may be collected of the locations 90 of the reference element 20 when users 10 point the handheld object 12 at the calibration location 80 and the heights of those users 10. The heights 102 of the locations 90 of the reference element 20 may be correlated to the heights of the users 10, and the scaling logic 58 may estimate the user's height 100 based on this predetermined correlation and the height 98 of the reference element 20. The model for identifying correlations may be populated with tables of standard correlation between height and reach (e.g., a ratio between height and arm length for various body types in a population).

User arm length estimation logic 62 of the scaling logic 58 may then estimate the user's arm length 104 based on the user height 100. The estimation may be made based on a predetermined correlation (e.g., an algorithm or table based on empirical data) between arm length 104 and user height 100. This predetermined correlation may be determined based on test or sample data, scientific data associated with proportions of the human body, and/or any other suitable source.

The scaling logic 58 may determine the one or more scaling factors based on the user's arm length 104. For example, when pointing away from an initial location (e.g., the calibration location 80), the camera 22 may detect the location of the reference element 20 to be closer to the initial location with a user 10 having a shorter arm length 104 compared to a user 10 having a longer arm length. As such, the scaling logic 58 may determine larger scaling factors for users 10 having longer arm lengths 104 compared to users 10 having shorter arm lengths 104. The scaling logic 58 may apply the one or more scaling factors to a subsequent detected location of the reference element 20 to scale (e.g., diminish or expand) the location to generate a projected target location of the reference element 20. The scaling factors may include horizontal and vertical components, be provided in the form of a transformation matrix, and inserted into the transformation matrix that includes translation factors from Equation 1 above, as shown below:

$$\begin{vmatrix} x \\ y \\ 1 \end{vmatrix} = \begin{vmatrix} k_1 * Y & 0 & X \\ 0 & k_2 * Y & Y \\ 0 & 0 & 1 \end{vmatrix} = \begin{vmatrix} x' \\ y' \\ 1 \end{vmatrix} \qquad \text{Equation 2}$$

where: $k_1$=a horizontal scaling factor generated based on user arm length 104; and
$k_2$=a vertical scaling factor generated based on user arm length 104.

The values of the scaling factors $k_1$ and k2 may be determined based on correlating test or sample data collected from users 10 pointing the handheld object 12 at various targets and the arm lengths 104 of those users 10. For example, the scaling logic 58 may determine that the height 98 of the reference element 20 from the ground 84 is 1.25 meters based on image data (e.g., a first or calibration image of imagery) received from the camera 22. The user height estimation logic 60 may determine that the user's height 100 is approximately 1.8 meters based on the height 98 of the reference element 20. The user arm length estimation logic 62 may determine that the user's arm length 104 is 0.6 meters based on the user's height 100. The scaling logic 58 may then determine that the horizontal scaling factor $k_1$ is 1.5 and the vertical scaling factor $k_2$ is 1.75 based on the user's arm length 104. Accordingly, the scaling logic 58 may generate the transformation matrix in Equation 2 with $k_1$=1.5 and $k_2$=1.75, and the projected location determination system 44 may apply the transformation matrix to a subsequent detected location of the reference element 20 to generate a projected target location of where the user 10 intended to point the handheld object 12, that compensates for differences in user arm length 104.

Figure 5:
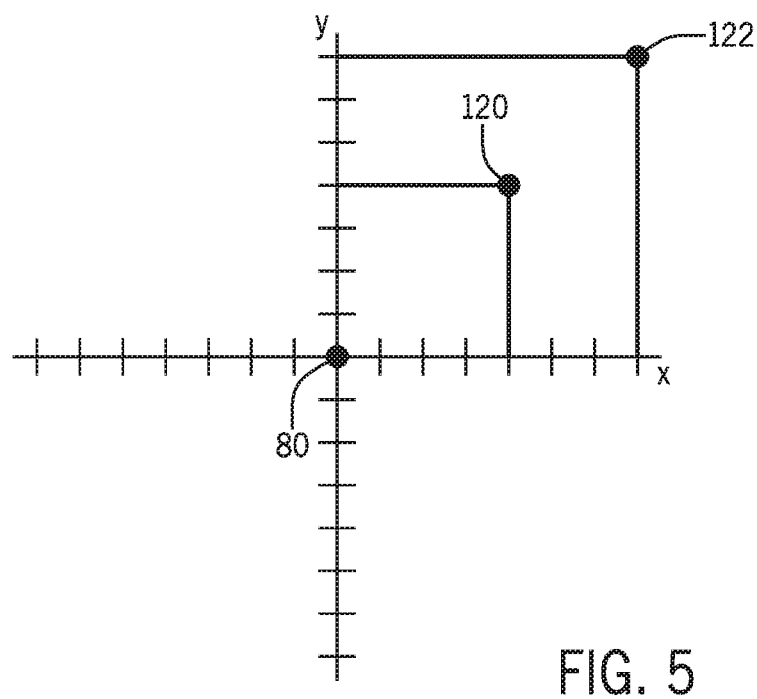
FIG. 5 is a diagram of an example of applying a scaling factors to a subsequent detected location of a reference element of the handheld object of FIG. 3, according to embodiments of the present disclosure.

For example, FIG. 5 is a diagram of an example of applying scaling factors to a subsequent detected location 120 of the reference element 20, according to embodiments of the present disclosure. As illustrated, the subsequent detected location 120 of the reference element 20 is 4 units (e.g., centimeters) to the right of the calibration location 80 and 4 units (e.g., centimeters) up from the calibration location 80 (e.g., [4, 4]). Applying the transformation matrix of Equation 2 having the horizontal scaling factor $k_1=1.5$ and the vertical scaling factor $k_2=1.75$ to the subsequent detected location 120 results in scaling the subsequent detected location 120 horizontally by 1.5, thus generating a projected target location 130 6 units to the right of the calibration location 80, and vertically by 1.7, thus generating a projected target location 130 7 units (e.g., centimeters) up (e.g., [6, 7]). Thus, the scaling logic 58 may compensate for differences in user arm lengths 104.

Figure 6:
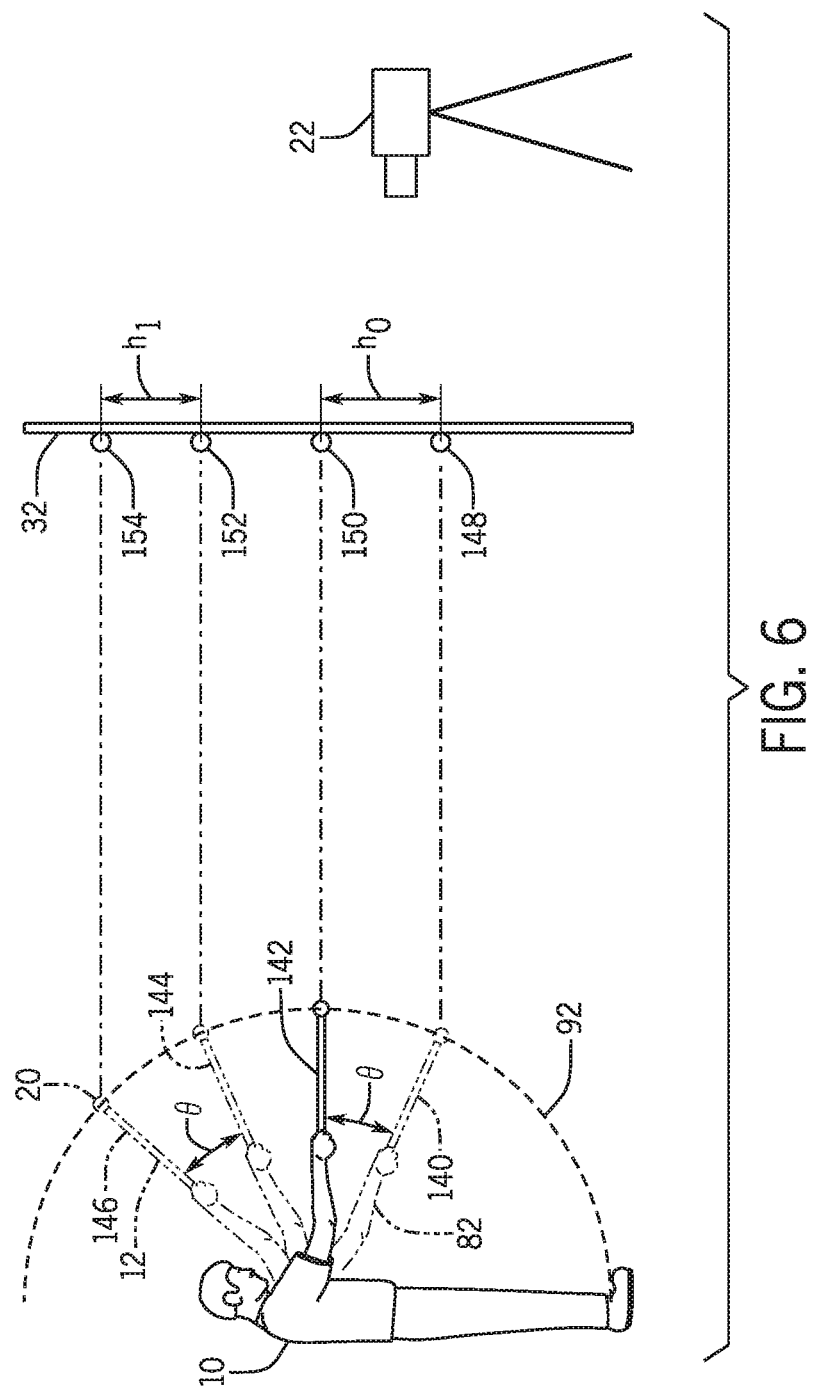
FIG. 6 is a diagram of a user pointing the handheld object at different targets of a system according to embodiments of the present disclosure.

Turning back to FIG. 2, the projected location determination system 44 may include arc distortion compensation logic 64 that compensates for the difference in shape between the arcuate nature 92 of the user's arm movement and the flat two-dimensional plane 32. For example, FIG. 6 is a diagram of a user 10 pointing the handheld object 12 at different targets. As illustrated, an angle θ formed between a first position 140 of the user's arm 82 and a second position 142 of the user's arm 82 is the same as between a third position 144 of the user's arm 82 and a fourth position 146 of the user's arm 82. However, as viewed and captured by the camera 22 on the two-dimensional plane 32, a distance $h_0$ between a first reference element location 148 corresponding to the first position 140 of the user's arm 82 and a second reference element location 150 corresponding to the second position 142 of the user's arm 82 is different (e.g., greater than) a distance $h_1$ between a third reference element location 152 corresponding to the third position 144 of the user's arm 82 and a fourth reference element location 154 corresponding to the fourth position 146 of the user's arm 82.

As such, the arc distortion compensation logic 64 may determine one or more offsets to apply to the projected target location that compensates for this distortion. The one or more offsets may shift the projected target location to increase or extend the distance between the projected target location and an initial location (e.g., the calibration location 80) to compensate for the difference in shape between the arcuate nature 92 of the user's arm movement and the flat two-dimensional plane 32. For example, the one or more offsets may be determined using regression analysis that fits test or sample data from users 10 pointing the handheld object 12 at various targets (e.g., with the reference element 20 along the arc 92) to an equation. In some embodiments, the arc distortion compensation logic 64 may fit the test data to a polynomial equation (e.g., a polynomial equation of the third order), though any suitable order or type of equation may be used. For example, a first polynomial equation of the third order (Equations 3 and 4 below) may be used to determine a horizontal offset to be applied to the projected target location that compensates for this distortion in the horizontal direction, and a second polynomial equation of the third order (Equations 5 and 6 below) may be used to determine a vertical offset to be applied to the projected target location that compensates for the distortion in the vertical direction:

$$x_{offset} = \Sigma_{i=0}^{3} \Sigma_{j=0}^{3} a_{ij} x^i y^j \qquad \text{Equation 3}$$

(which may be additionally or alternatively represented as:

$$x_{offset} = ax^3 + by^3 + cx^2y + dxy^2 + ex^2 + fy^2 + gxy + hx + ky + l \qquad \text{Equation 4}$$

$$y_{offset} = \Sigma_{i=0}^{3} \Sigma_{j=0}^{3} b_{ij} y^i x^j \qquad \text{Equation 5}$$

(which may be additionally or alternatively represented as:

$$y_{offset} = ay^3 + bx^3 + cy^2x + dyx^2 + ey + fx^2 + gyx + hy + kx + l \qquad \text{Equation 6}$$

where: $x_{offset}$=the horizontal offset to be applied to a projected target location;

$y_{offset}$=the vertical offset to be applied to the projected target location;

x=the horizontal component of the projected target location;

y=the vertical component of the projected target location; and $a_i$, $b_i$, $c_i$, a, b, c, d, e, f, g, h, k, and l=constants that are determined using regression analysis, wherein each constant may be different from Equation to Equation (e.g., constant a in Equation 4 may be different from constant a in Equation 6).

The horizontal component of the projected target location may be measured as a horizontal distance away from an initial location (e.g., corresponding to the calibration location 80 and/or when the user 10 points the handheld object 12 directly at the camera 22), while the vertical component of the projected target location may be measured as a vertical distance away from the initial location. As previously mentioned, for any of the polynomial Equations 3-6, the constants a, b, c, d, e, f, g, h, k, and l may be determined by fitting test or sample data to a polynomial equation using polynomial regression analysis (and may be different between the Equations). As such, the one or more offsets may be determined for each projected target location as the user 10 moves and points the handheld object 12.

However, applying any of Equations 3-6 to determine the horizontal and vertical offsets for each projected target location as the user 10 moves and points the handheld object 12 may be time-consuming and use excessive computing resources (e.g., processing, memory, storage, or networking resources). As such, to more efficiently compensate for the difference in shape between the arcuate nature 92 of the user's arm movement and the flat two-dimensional plane 32, in some embodiments, the arc distortion compensation logic 64 may divide the arc 92 at which the reference element 20 may be located into multiple reference element zones, each of which may correspond to a respective projected target zone (e.g., projected on the two-dimensional plane). Each projected target zone may correspond to a respective set of polynomial equations that may accurately compensate for the distortion applicable to that projected target zone. As such, the camera 22 may detect the reference element 20 in a reference element zone, the arc distortion compensation logic 64 may determine a respective projected target zone that corresponds to the reference element zone, and the arc distortion compensation logic 64 may apply a respective set of polynomial equations that corresponds to the respective projected target zone to the location of the reference element to determine the one or more offsets to be applied to the location of the reference element to compensate for this distortion. In such embodiments, the multiple reference element zones may be different sizes (e.g., the reference element zones decrease in size the farther the reference element zone is from the two-dimensional plane 32) while the multiple projected target zones are the same size, or the multiple reference element zones may be the same size while the multiple projected target zones are different sizes (e.g., the projected target zones increase in size the farther the projected target zone is from the reference element 20).

Figure 7:
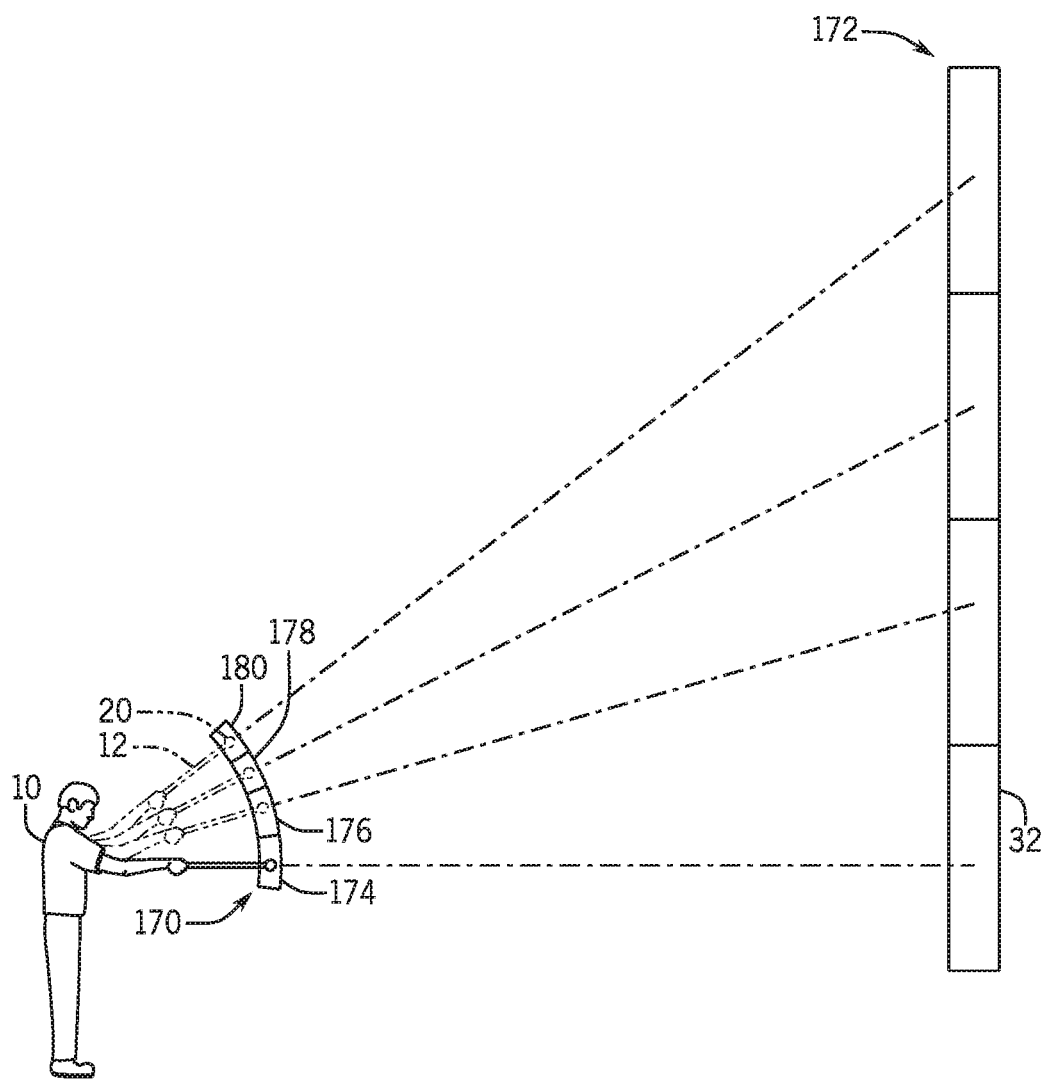
FIG. 7 is a diagram of differently-sized multiple reference element zones and uniformly-sized multiple projected target zones, according to embodiments of the present disclosure.

FIG. 7 is a diagram of differently-sized multiple reference element zones 170 and uniformly-sized multiple projected target zones 172, according to embodiments of the present disclosure. As illustrated, a first reference element zone 174 closest to the two-dimensional plane 32 is largest in size, a second reference element zone 176 next closest to the two-dimensional plane 32 is next largest in size (but smaller than the first reference element zone 174), a third reference element zone 178 next closest to the two-dimensional plane 32 is next largest in size (but smaller than the second reference element zone 176), and a fourth reference element zone 180 next closest to the two-dimensional plane 32 is next largest in size (but smaller than the third reference element zone 178). While four reference element zones 170 are illustrated in FIG. 7, it should be understood that any suitable number of reference element zones 170 are contemplated of any suitable size, where the reference element zones 170 decrease in size the farther the reference element zone 170 is from the two-dimensional plane 32. Moreover, each projected target zone 172 is the same size as other projected target zones 172, corresponds to a respective reference element zone 170, and corresponds to a respective set of polynomial equations that generate respective offsets (e.g., horizontal and vertical offsets) that may be applied to a location of the reference element 20. In particular, each set of polynomial equations that corresponds to a respective projected target zone 172 may have different value sets for constants a, b, c, d, e, f, g, h, k, and l, as provided in any of Equations 3-6 (and may be different between the Equations). Decreasing the sizes of the reference element zones 170 the farther the reference element zone 170 is from the two-dimensional plane 32, while maintaining the same sizes of the projected target zones 172, may enable the arc distortion compensation logic 64 to compensate for the difference in shape between the arcuate nature 92 of the user's arm movement and the flat two-dimensional plane 32 in an efficient and resource-conserving manner.

Figure 8:
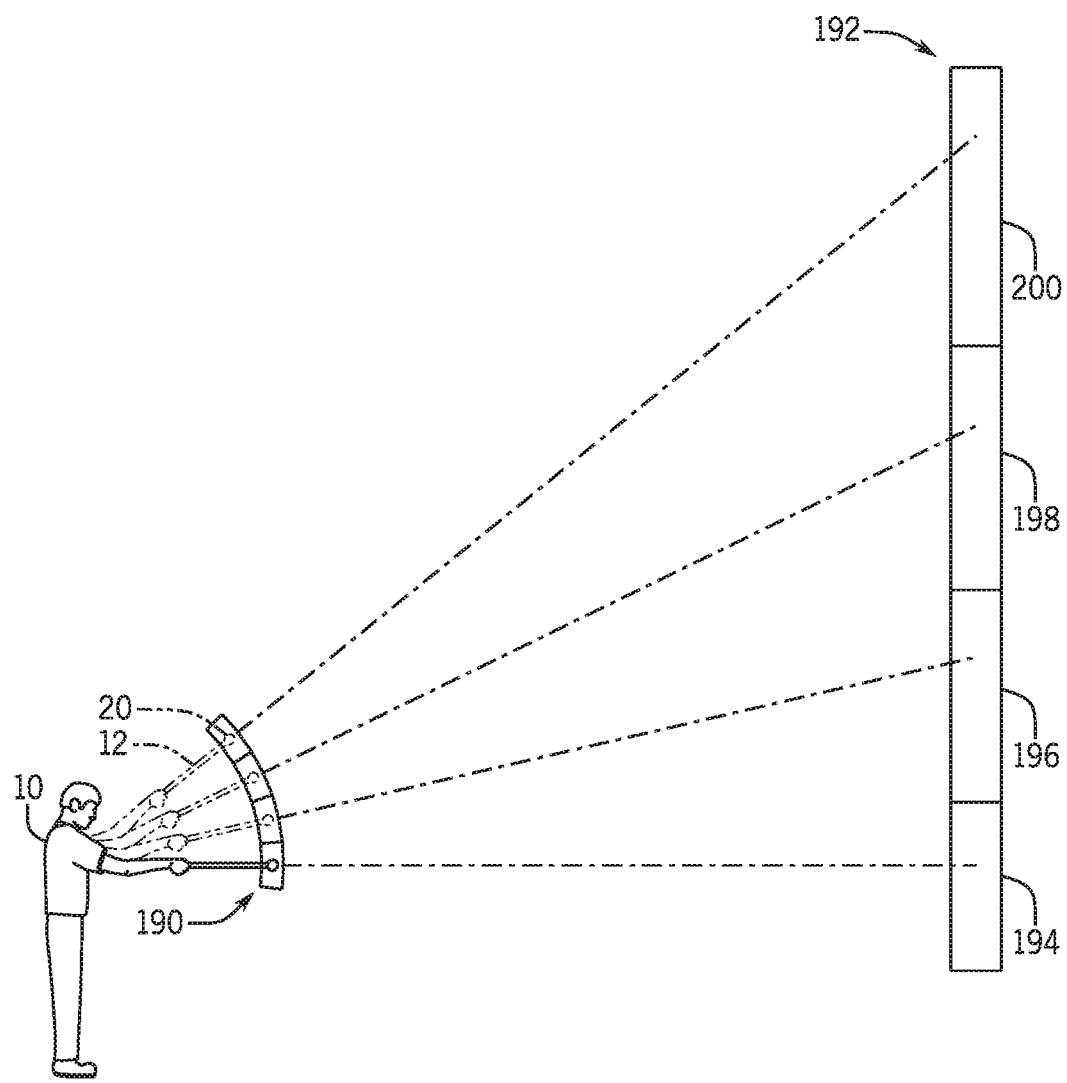
FIG. 8 is a diagram of uniformly-sized multiple reference element zones and differently-sized multiple projected target zones, according to embodiments of the present disclosure.

FIG. 8 is a diagram of uniformly-sized multiple reference element zones 190 and differently-sized multiple projected target zones 192, according to embodiments of the present disclosure. As illustrated, each reference element zone 190 is the same size. However, a first projected target zone 194 closest to the reference element 20 is smallest in size, a second projected target zone 196 next closest to the reference element 20 is next smallest in size (but larger than the first projected target zone 194), a third projected target zone 198 next closest to the reference element 20 is next smallest in size (but larger than the second projected target zone 196), and a fourth projected target zone 200 next closest to the reference element 20 is next smallest in size (but larger than the third projected target zone 198). While four projected target zones 192 are illustrated in FIG. 8, it should be understood that any suitable number of projected target zones 192 are contemplated of any suitable size, where the projected target zones 192 increase in size the farther the projected target zone 192 is from the reference element 20. Each projected target zone 192 corresponds to a respective reference element zone 190, and also corresponds to a respective set of polynomial equations that generate respective offsets (e.g., horizontal and vertical offsets) that may be applied to a location of the reference element 20. In particular, each set of polynomial equations that corresponds to a respective projected target zone 192 may have different value sets for constants a, b, c, d, e, f, g, h, j, k, and l, as provided in any of Equations 3-6 (and may be different between the Equations). Increasing the sizes of the projected target zones 192 the farther the projected target zone 192 is from the reference element 20, while maintaining the same sizes of the reference element zones 190, may enable the arc distortion compensation logic 64 to compensate for the difference in shape between the arcuate nature 92 of the user's arm movement and the flat two-dimensional plane 32 in an efficient and resource-conserving manner.

It should be noted that, for the purpose of simplicity, FIGS. 6-8 illustrate the distortion caused by the difference in shape between the arcuate nature 92 of the user's arm movement and the flat two-dimensional plane 32 in only the vertical (e.g., y) direction. However, the presently disclosed systems and methods contemplate compensating for the distortion in any suitable direction, including the horizontal (e.g., x) direction, as evidenced by Equations 3 and 4, which provide a horizontal offset to compensate for distortion in the horizontal direction, and the vertical (e.g., y) direction, as evidenced by Equations 5 and 6, which provide a vertical offset to compensate for distortion in the vertical direction.

Turning back to FIG. 2, if the projected location determination system 44 determines that the projected target location corresponds to a target 14 printed on, etched on, written on, attached on, or otherwise displayed on the structure 15. Then an output device 66 of the user interaction system 42 may output a user interaction experience. The output device 66 may be any suitable device that is capable of outputting a desired user interaction experience, such as an electronic display, a speaker, a virtual reality device, an augmented reality device, an actuator, and/or an animated device (e.g., a robotic figure). The target 14 may be a part of, fixed to, attached to, or include the output device 66, or the target 14 may be separate from the output device 66. For example, in the setting of a theme park, the target 14 and the output device 66 may both be an animated object of an attraction, and, in response to determining that the projected target location corresponds to the animated object, the animated object may output a user interaction experience (e.g., wagging a tail). As another example, the target 14 may be a word printed on a poster and the output device 66 may be a nearby speaker, and, in response to determining that the projected target location corresponds to the word printed on the poster, the nearby speaker may output a voice speaking the word. As yet another example, the target 14 may be an image of a person on an electronic display and the output device 66 may be the electronic display, and, in response to determining that the projected target location corresponds to the image of the person, the electronic display may play a video showing the person of the image performing a signature action.

Figure 9:
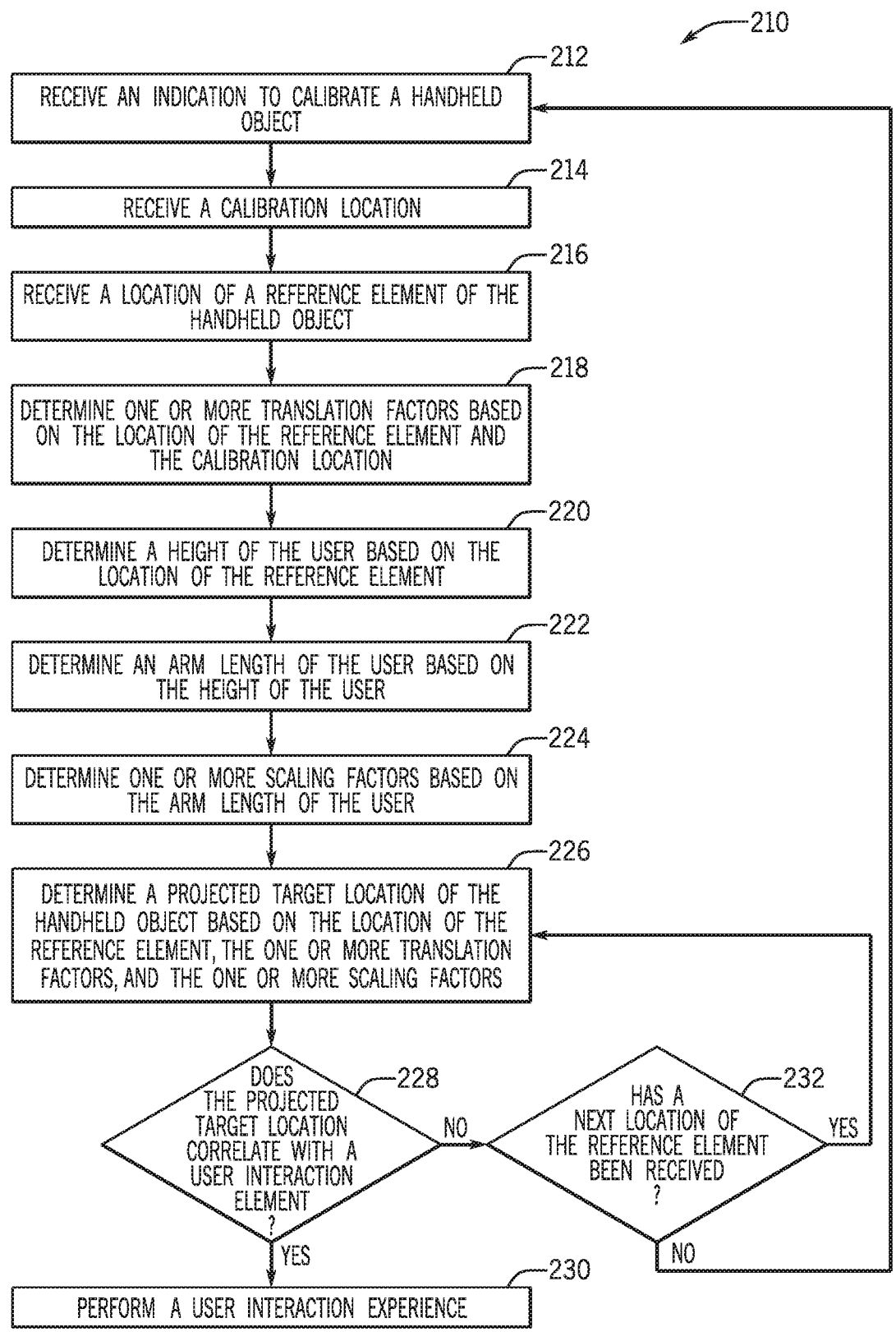
FIG. 9 is a flow diagram of a process for determining a projected target location of the handheld object of FIG. 3, according to embodiments of the present disclosure.

With this in mind, FIG. 9 is a flow diagram of a process 210 for determining a projected target location of a handheld object 12, according to embodiments of the present disclosure. The process 210 may be performed by any suitable device that may determine the projected target location of the handheld object 12, such as any component of the projected location determination system 44, including the controller 46, the processor 48, the reference element location detection logic 52, the transformation logic 54, the translation logic 56, the scaling logic 58, the user height estimation logic 60, and/or the user arm length logic 62. While the process 210 is described using steps in a specific sequence, it should be understood that the present disclosure contemplates that the described steps may be performed in different sequences than the sequence illustrated, and certain described steps may be skipped or not performed altogether. In some embodiments, the process 210 may be implemented by executing instructions stored in a tangible, non-transitory, computer-readable medium, such as the memory device 50, using a processor, such as the processor 48.

As illustrated, in process block 212, the processor 48 receives an indication to calibrate a handheld object 12. The indication may be in the form of an image (e.g., a first or calibration image of imagery) captured by the camera 22, which includes a presence of the reference element 20 of the handheld object 12. In some embodiments, a motion sensor or other suitable sensor capable of indicating that a user 10 has entered a viewing area of the camera 22 with a handheld object 12 having the reference element 20 may provide the indication.

In process block 214, the processor 48 receives a calibration location 80. In particular, the calibration location 80 may be predetermined and known to the processor 48, as the calibration location 80 may be fixed on the structure 15 or displayed by the processor 48 on the structure 15.

In process block 216, the processor 48 receives a location of the reference element 20 of the handheld object 12. For example, the camera 22 may provide an image (e.g., a second or subsequent image of imagery captured by the camera 22) of the reference element 20. The processor 48 may then instruct the reference element location detection logic 52 to determine the location of the reference element 20 on the two-dimensional plane 32.

In process block 218, the processor 48 instructs the translation logic 56 to determine one or more translation factors based on the location of the reference element 20 and the calibration location 80. The one or more translation factors may compensate for a difference between the user's perception as to where they are pointing the handheld object 12 and the camera's determination of where the reference element 20 is located on the two-dimensional plane 32. In particular, the translation logic 56 may determine the one or more translation factors by performing a single-point calibration process. This process includes receiving a calibration location on the two-dimensional plane 32, receiving a location of the reference element 20 on the two-dimensional plane 32 (e.g., corresponding to when the user 10 points the handheld object 12 at the calibration location), and determining the one or more translation factors based on the difference in locations between the calibration location and the location of the reference element 20.

The translation logic 56 may use the difference to generate the one or more translation factors that may be applied to subsequent detected locations of the reference element 20 to shift the subsequent detected locations of the reference element 20 and determine subsequent projected target locations of the handheld object 12 that correspond to where the user 10 intended to point the handheld object 12. The translation factors may be provided in the form of a transformation matrix, which may be applied to a subsequent detected location of the reference element 20 to generate a projected target location of the reference element 20, as shown in Equation 1.

In process block 220, the processor 48 instructs the user height estimation logic 60 to determine a height 100 of the user 10 based on the location of the reference element 20. In process block 222, the processor 48 instructs the user arm length estimation logic 62 to determine the arm length 104 of the user 10 based on the height 100 of the user 10.

In process block 224, the processor 48 instructs the scaling logic 58 to determine one or more scaling factors based on the arm length 104 of the user 10. The scaling logic 58 may provide the scaling factors in the transformation matrix of Equation 2 as shown above. The scaling factors may compensate for differences in user arm length 104 by scaling (e.g., multiplying) on the location of the reference element 20 with respect to an initial location (e.g., the calibration location 80).

In process block 226, the processor 48 instructs the transformation logic 54 to determine a projected target location of the handheld object 12 based on the location of the reference element 20, the one or more translation factors, and the one or more scaling factors. In particular, the transformation logic 54 may apply the transformation matrix of Equation 2 that includes the one or more translation factors and the one or more scaling factors to the location of the reference element 20 to generate the projected target location. That is, the projected target location may correspond to where the user 10 perceives they are pointing or intends to point.

In decision block 228, the processor 48 determines whether the projected target location correlates with a user interaction element. The user interaction element may be any suitable target that serves as a trigger to perform a user interaction experience. For example, the user interaction element may include any feature of interest that the user 10 may expect, when pointing at with the handheld object 12, would cause the user interaction experience to be performed.

If the processor 48 determines that the projected target location correlates with a user interaction element, then, in process block 230, the processor 48 instructs the user interaction system 42 to perform a respective user interaction experience using the appropriate output device 66. For example, the output device 66 may be an animated object of an attraction, and the user interaction system 42 may cause the animated object to bark, meow, speak, move, blink, and so on. As another example, the output device 66 may be a speaker, and the user interaction system 42 may cause the speaker to output a sound, voice, music, and so on. As yet another example, the output device 66 may be an electronic display, and the user interaction system 42 may cause the electronic display to display an image, play a video, and so on.

If the processor 48 determines that the projected target location does not correlate with a user interaction element, then, in decision block 232, the processor 48 determines whether a next location of the reference element 20 has been received. If so, the processor 48 repeats process block 226 and determines the projected target location of the handheld object 12 based on the next location of the reference element 20 and the translation factors and scaling factors that have already been determined from process blocks 218 and 224.

If the processor 48 determines that a next location of the reference element 20 has not been received, then the processor 48 repeats process block 212 to receive a next indication to calibrate the handheld object 12 (e.g., from a next user 10). In this manner, the process 210 may determine a projected target location of the handheld object 12 using single-point calibration (e.g., without requiring the user 10 to point the handheld object 12 at more than one point to calibrate the projected location determination system 44) that compensates for both a difference between the user's perception as to where they are pointing the handheld object 12 and the camera's determination of where the reference element 20 is located on the two-dimensional plane 32, as well as differences in user arm length 104.

Figure 10:
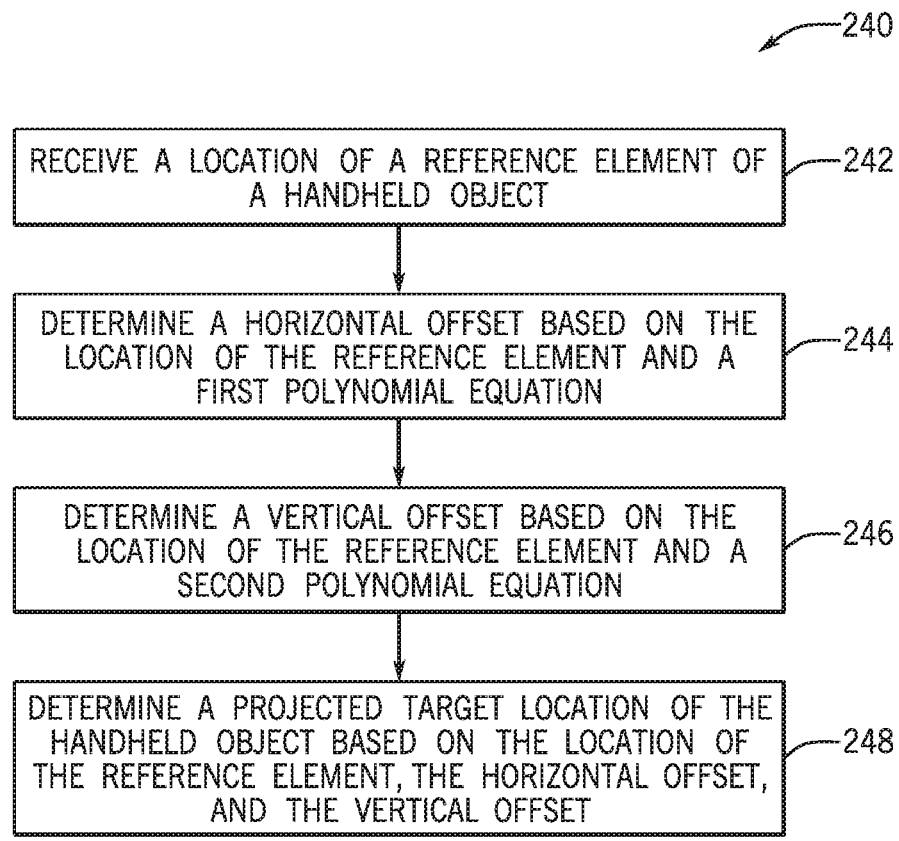
FIG. 10 is a flow diagram of a process for compensating for the distortion caused by a difference in shape between an arcuate nature of a user's arm movement and a two-dimensional plane, according to embodiments of the present disclosure.

Moreover, the projected location determination system 44 may also compensate for the distortion caused by the difference in shape between the arcuate nature 92 of the user's arm movement and the flat two-dimensional plane 32, as illustrated in FIG. 6. FIG. 10 is a flow diagram of a process 240 for compensating for this distortion, according to embodiments of the present disclosure. The process 240 may be performed by any suitable device that may compensate for this distortion, such as any component of the projected location determination system 44, including the controller 46, the processor 48, and/or the arc distortion compensation logic 64. While the process 240 is described using steps in a specific sequence, it should be understood that the present disclosure contemplates that the described steps may be performed in different sequences than the sequence illustrated, and certain described steps may be skipped or not performed altogether. In some embodiments, the process 240 may be implemented by executing instructions stored in a tangible, non-transitory, computer-readable medium, such as the memory device 50, using a processor, such as the processor 48.

As illustrated, in process block 242, the processor 48 receives a location of a reference element 20 of a handheld object 12. In some embodiments, the processor 48 may receive a projected target location of the handheld object 12.

In process block 244, the processor 48 determines a horizontal offset based on the location of the reference element 20 and a first polynomial equation. In particular, the processor 48 may receive the projected target location of the handheld object 12, or determine the projected target location using the process 210 of FIG. 9. The processor 48 may then instruct the arc distortion compensation logic 64 to apply polynomial Equation 3 or 4 to the projected target location of the handheld object 12 to determine the horizontal offset.

In process block 246, the processor 48 determines a vertical offset based on the location of the reference element 20 and a second polynomial equation. In particular, the processor 48 may instruct the arc distortion compensation logic 64 to apply polynomial Equation 5 or 6 to the projected target location of the handheld object 12 to determine the vertical offset.

In process block 248, the processor 48 determines a projected target location of the handheld object 12 based on the location of the reference element 20, the horizontal offset, and the vertical offset. In particular, the processor 48 may instruct the arc distortion compensation logic 64 to apply (e.g., add) the horizontal offset to a horizontal component (e.g., the x-coordinate) of the projected target location and apply (e.g., add) the vertical offset to a vertical component (e.g., the y-coordinate) of the projected target location to generate the projected target location.

In some embodiments, to more efficiently compensate for the difference in shape between the arcuate nature 92 of the user's arm movement and the flat two-dimensional plane 32, the arc distortion compensation logic 64 may divide the arc 92 at which the reference element 20 may be located into multiple reference element zones, each of which may correspond to a respective projected target zone (e.g., projected on the two-dimensional plane). Each projected target zone may correspond to a respective set of polynomial equations that may accurately compensate for the distortion applicable to that projected target zone. As such, the camera 22 may detect the reference element 20 in a reference element zone, the arc distortion compensation logic 64 may determine a respective projected target zone that corresponds to the reference element zone, and the arc distortion compensation logic 64 may apply a respective set of polynomial equations that corresponds to the respective projected target zone to the location of the reference element to determine the one or more offsets to be applied to the location of the reference element to compensate for this distortion. In such embodiments, the multiple reference element zones may be different sizes (e.g., the reference element zones decrease in size the farther the reference element zone is from the two-dimensional plane 32) while the multiple projected target zones are the same size, as shown in FIG. 7, or the multiple reference element zones may be the same size while the multiple projected target zones are different sizes (e.g., the projected target zones increase in size the farther the projected target zone is from the reference element 20), as shown in FIG. 8.

In this manner, the process 240 may compensate for the arcuate nature 92 of the user's arm movement and the flat two-dimensional plane 32. Moreover, to compensate for the difference between the user's perception as to where they are pointing the handheld object 12 and the camera's determination of where the reference element 20 is located on the two-dimensional plane 32, differences in user arm length 104, and the difference in shape between the arcuate nature 92 of the user's arm movement and the flat two-dimensional plane 32, the process 240 of FIG. 10 may be performed before, after, or as part of the process 210 of FIG. 9.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A theme park attraction system comprising:
 a user interaction system comprising:
  a camera configured to capture imagery of a reference element of a handheld object on a two-dimensional plane; and
  an output device configured to output a user interactive experience;
 a projected location determination system communicatively coupled to the user interaction system, wherein the projected location determination system comprises a controller having one or more processors and a memory, the memory storing machine-readable instructions configured to cause the one or more processors to:
  determine one or more translation factors representative of a difference in location between a calibration location and an initial location of the reference element on the two-dimensional plane captured in the imagery;
  determine one or more scaling factors correlative to a user arm length based on the imagery;
  determine a current location of the reference element on the two-dimensional plane captured in the imagery;
  determine a projected target location of the handheld object based on the current location of the reference element, the one or more translation factors, and the one or more scaling factors; and
  instruct the output device to output the user interactive experience in response to determining that the projected target location corresponds to a target location.

2. The theme park attraction system of claim 1, wherein the machine-readable instructions are configured to cause the one or more processors to determine the one or more translation factors and the one or more scaling factors based on a first image of the imagery.

3. The theme park attraction system of claim 2, wherein the machine-readable instructions are configured to cause the one or more processors to determine the current location of the reference element based on a second image of the imagery.

4. The theme park attraction system of claim 1, wherein the one or more translation factors compensate for a difference between a user perception of where the handheld object is pointing in three-dimensional space and a corresponding location of the reference element in the two-dimensional plane.

5. The theme park attraction system of claim 1, wherein the one or more scaling factors compensate for differences in user arm lengths.

6. The theme park attraction system of claim 1, wherein the machine-readable instructions are configured to cause the one or more processors to determine the one or more scaling factors based on the location of the reference element on the two-dimensional plane.

7. The theme park attraction system of claim 1, wherein the machine-readable instructions are configured to cause the one or more processors to:
 determine a user height based on the location of the reference element on the two-dimensional plane; and
 determine the user arm length based on the user height.

8. The theme park attraction system of claim 1, wherein the machine-readable instructions are configured to cause the one or more processors to:
 determine one or more offsets based on the projected target location and one or more polynomial equations;
 apply the one or more offsets to the projected target location; and
 instruct the output device to output the user interactive experience in response to determining that the projected target location corresponds to a target location on the two-dimensional plane after applying the one or more offsets to the projected target location.

9. The theme park attraction system of claim 8, wherein the one or more offsets to compensate for a difference in shape between an arcuate nature of an arm movement of a user and the two-dimensional plane.

10. The theme park attraction system of claim 8, wherein at least one of the one or more polynomial equations is of a third order.

11. A system comprising:
 one or more processors; and
 a memory storing machine-readable instructions configured to cause the one or more processors to:
  determine one or more translation factors representative of a difference in location between a calibration location on a two-dimensional plane and an initial location of a reference element of a handheld object in a first image on the two-dimensional plane;
  determine one or more scaling factors correlative to a user arm length based on the first image;
  determine a current location of the reference element in a second image on the two-dimensional plane;
  determine a projected target location of the handheld object based on the current location of the reference element, the one or more translation factors, and the one or more scaling factors; and
  output a user interactive experience in response to determining that the projected target location corresponds to a target location.

12. The system of claim 11, wherein the machine-readable instructions are configured to cause the one or more processors to determine a transformation matrix comprising the one or more translation factors and the one or more scaling factors.

13. The system of claim 12, wherein the machine-readable instructions are configured to cause the one or more processors to determine the projected target location of the handheld object by applying the transformation matrix to the current location of the reference element.

14. The system of claim 11, wherein the one or more translation factors comprise a horizontal component, and wherein the machine-readable instructions are configured to cause the one or more processors to determine the horizontal component based on a horizontal difference between the calibration location and the initial location of the reference element.

15. The system of claim 14, wherein the one or more translation factors comprise a vertical component, and wherein the machine-readable instructions are configured to cause the one or more processors to determine the vertical component based on a vertical difference between the calibration location and the initial location of the reference element.

16. The system of claim 11, wherein the one or more scaling factors comprise a horizontal component, and wherein the machine-readable instructions are configured to cause the one or more processors to determine the horizontal component based on the user arm length.

17. The system of claim 16, wherein the one or more scaling factors comprise a vertical component, and wherein the machine-readable instructions are configured to cause the one or more processors to determine the vertical component based on the user arm length.

18. A method comprising:
 receiving a calibration location on a two-dimensional plane;
 receiving an initial location of a reference element of a handheld object on the two-dimensional plane captured in imagery;
 determining one or more translation factors based on the calibration location and the initial location of the reference element;
 determining one or more scaling factors based on the initial location of the reference element;
 determining a current location of the reference element on the two-dimensional plane captured in the imagery;
 determining a projected target location of the handheld object based on the current location of the reference element, the one or more translation factors, and the one or more scaling factors; and
 outputting a user interactive experience in response to determining that the projected target location corresponds to a target location.

19. The method of claim 18, wherein determining the one or more translation factors is based on a difference between the calibration location and the initial location of the reference element on the two-dimensional plane.

20. The method of claim 18, comprising determining a user height based on the initial location of the reference element.

21. The method of claim 20, comprising determining a user arm length based on the user height.

22. The method of claim 20, wherein determining the one or more scaling factors is based on the user height.

23. The method of claim 21, wherein determining the one or more scaling factors is based on the user arm length.

* * * * *

UNITED STATES PATENT AND TRADEMARK OFFICE
CERTIFICATE OF CORRECTION

PATENT NO. : 11,100,790 B2  
APPLICATION NO. : 16/749865  
DATED : August 24, 2021  
INVENTOR(S) : Yu-Jen Lin et al.

Page 1 of 2

It is certified that error appears in the above-identified patent and that said Letters Patent is hereby corrected as shown below:

In the Drawings

In Fig. 4, Sheet 4 of 9, delete " 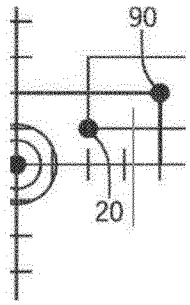 " and insert -- 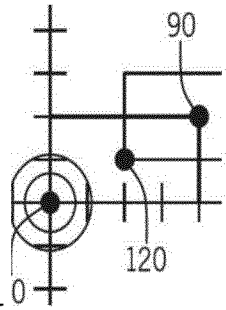 -- therefor.

In Fig. 5, Sheet 4 of 9, delete " 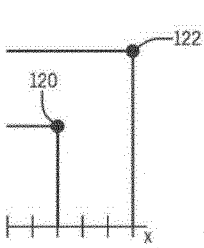 " and insert -- 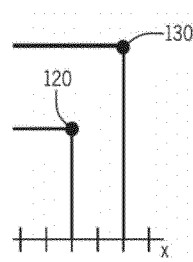 -- therefor.

In the Specification

In Column 9, Line 22, delete "2" and insert --4-- therefor.

In Column 9, Line 23, delete "1 unit" and insert --2 units-- therefor.

In Column 9, Line 25, delete "+2" and insert --+4-- therefor.

In Column 9, Line 25, delete "+1" and insert --+2-- therefor.

Signed and Sealed this  
Ninth Day of August, 2022

Katherine Kelly Vidal  
*Director of the United States Patent and Trademark Office*

CERTIFICATE OF CORRECTION (continued)
U.S. Pat. No. 11,100,790 B2

In Column 9, Line 26, delete "+2" and insert --+4-- therefor.

In Column 9, Line 27, delete "+1" and insert --+2-- therefor.

In Column 9, Line 29, delete "(e.g., [4, 2])" and insert --(e.g., [2, 1])-- therefor.

In Column 9, Line 31, delete "2" and insert --4-- therefor.

In Column 9, Line 31, delete "1 unit" and insert --2 units-- therefor.